Sept. 17, 1968  KEE W. KIM  3,401,915
RESILIENT MATERIAL VALVE SEAL RING
Filed May 10, 1966
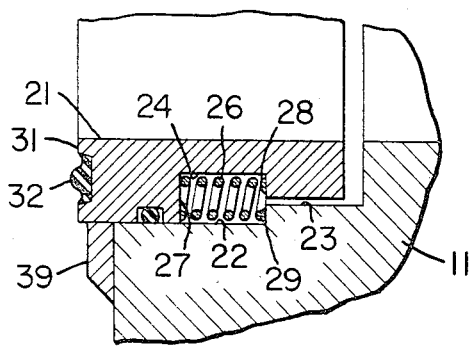
FIG_3
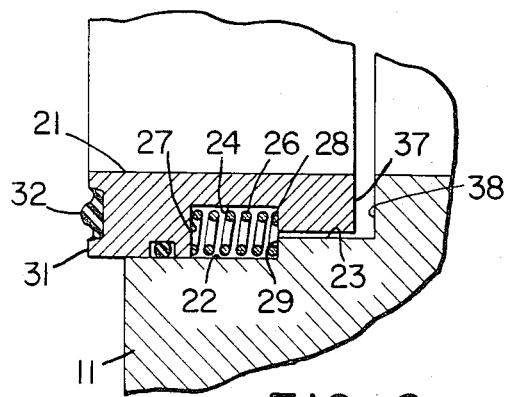
FIG_2
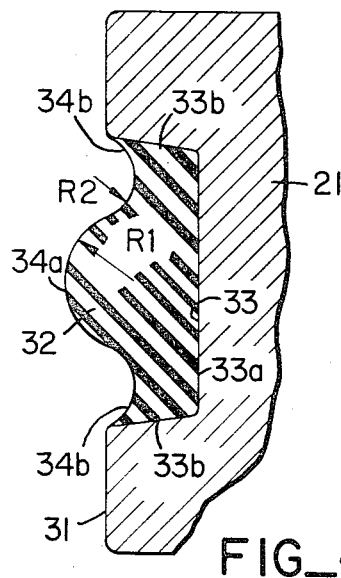
FIG_4
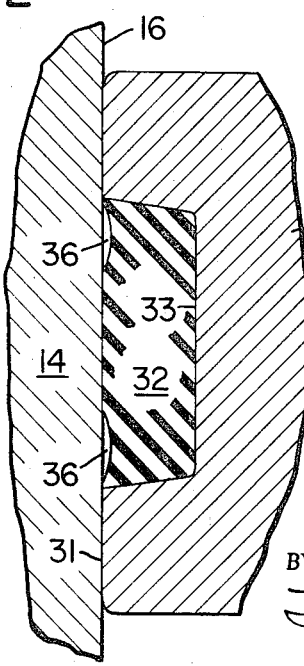
FIG_5
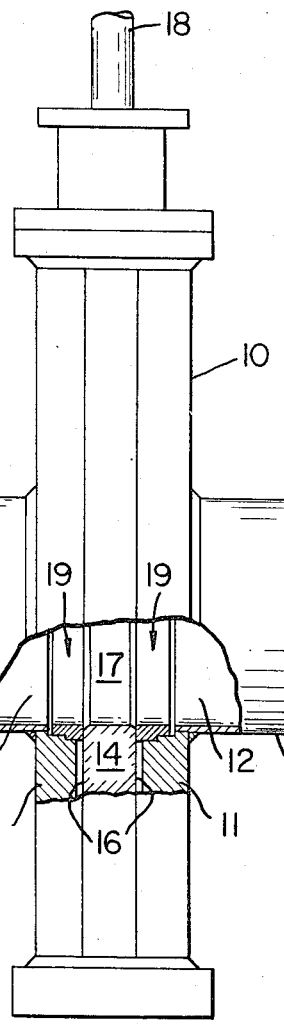
FIG_1
INVENTOR.
KEE W. KIM
BY
ATTORNEYS United States Patent Office
3,401,915
Patented Sept. 17, 1968

3,401,915
RESILIENT MATERIAL VALVE SEAL RING
Kee W. Kim, Houston, Tex., assignor to M & J Valve Company, Houston, Tex., a corporation of Delaware
Filed May 10, 1966, Ser. No. 548,936
1 Claim. (Cl. 251—174)

ABSTRACT OF THE DISCLOSURE

A valve having a spring pressed metal seal ring with an insert of resilient material. The configuration of the insert in section is such as to form a convex surface portion for sealing contact with an adjacent valve working surface. This convex surface is intermediate of concave portions. When the insert is fully compressed annular spaces exist between the concave surface portions and the adjacent valve working surface.

---

This invention relates generally to the construction of valves such as are used for controlling flow of various fluids, including liquids and gases.

In copending application Ser. No. 453,403, filed May 5, 1965, now Patent 3,269,695, there is disclosed a valve construction having sealing assemblies that include seal rings formed of nylon with inserts of softer resilient material, such as a suitable synthetic rubber or elastomer. Such valves have found wide acceptance, particularly where it is important to provide tight shutoff under conditions where the valve may be frequently operated. A characteristic of such seal rings is that the softer insert provides a desirable wiping action on the metal valve working surfaces. Because of certain properties of nylon seal rings, the inserts remain intact and are not dislodged or mutilated during operation under varying conditions. When valves are made in the larger sizes, such as 36 to 42 inch pipe diameter, nylon seal rings are relatively weak and are subject to twisting and warping, even when attached to a metal carrier.

In the construction of the larger sized valves, and in certain other instances, it is desirable to make the seal rings of the sealing assemblies from a more rigid material than nylon, as for example, a suitable metal or metal alloy. However, when it is attempted to apply resilient inserts in the manner disclosed in my said application Ser. No. 453,403, to such hard metal rings, it has been found that the resilient inserts are either dislodged or seriously mutilated during operation.

In general, it is an object of the present invention to provide a novel valve construction having sealing means characterized by the use of metal seal rings with resilient inserts. The seal rings made in accordance with the present invention are characterized by a particular form of resilient insert which has the ability to maintain the desired tight seal, while at the same time avoiding dislodgment or mutilation during operation of the valve.

Another object of the invention is to provide a valve construction which is particularly applicable to valves of relatively large size.

Additional objects and features of the invention will appear from the following description in which the preferred embodiment has been set forth in detail in conjunction with the accompanying drawing.

Referring to the drawing:

FIGURE 1 is a side elevational view, partly in section, showing a valve incorporating the present invention;

FIGURE 2 is a detail in section on an enlarged scale, showing one of the sealing assemblies incorporated in FIGURE 1;

FIGURE 3 is a detail like FIGURE 2, but showing the addition of stop means for engaging the gate;

FIGURE 4 is a detail on a greatly enlarged scale showing that side of the seal ring which engages the gate, together with its resilient insert; and FIGURE 5 is a detail like FIGURE 4 but showing the seal ring being pressed against the valve working surface of a gate.

The valve shown in FIGURE 1 is a valve of the gate type and has a body 10 which is box-like and which may be made by fabrication methods. The flat end walls 11 of the body are shown provided with aligned openings 12 which may connect with associated piping 13. The movable valve gate 14 is of the slab-type, and has its sides 16 finished to form flat valve working surfaces. The gate may be of the throughport type with a port 17 which registers with the openings 12, or a plain gate may be used. One end of the gate is connected with the valve operating stem 18. This stem may connect with suitable means for operating the valve, such as manual operating means, or power operators of the hydraulic, pneumatic or electrical type. Annular sealing assemblies 19 are carried by the end walls 11, and provide seals between the body and the valve working surfaces 16 of the gate.

FIGURES 2 and 3 show the construction of each sealing assembly. It consists of a sleeve-like ring 21 which may be made of suitable metal or metal alloy. The end wall 11 of the valve body is machined to provide the two cylindrical machined surfaces 22 and 23 which are on slightly different diameters. The ring 21 is dimensioned whereby it slidably fits the cylindrical surface 22 and whereby it has a substantial amount of movement in the direction of its axis. The ring 21 is also machined to provide the annular recess 24 which accommodates the circumferentially spaced coiled compression springs 26.

When the assembly is relaxed as shown in FIGURE 2, one end of each spring bears upon the annular shoulder 27 of the seal ring, and the other end of the same spring bears upon the annular shoulder 28. This engagement of the coil springs with the two shoulders 27 and 28 can be made before the assembly is inserted within the valve body, and serves to retain the springs assembled with respect to the seal ring. When the seal ring 21 is forced to the right as viewed in FIGURE 2, each of the springs 26 is compressed against the annular shoulder 29 formed on the valve body, or in other words, on the end wall 11 of the valve body.

The side face 31 of the seal ring which engages the gate 14 is provided with a resilient insert 32. This insert extends circumferentially and is accommodated within the circumferential recess 33 which is machined in the seal ring. It will be noted that the recess 33 is defined by the bottom surface 33a and the slightly divergent outer and inner surfaces 33b.

In practice the insert may be made of a suitable synthetic rubber or elasotmer. Preferably it is molded and cured in the recess whereby it is securely bonded to the surfaces 33a and 33b. Its hardness may be of the order of 60 to 90 durometer (A scale).

When the insert 32 is relaxed, or in other words when it is not compressed by contact with an adjacent valve working surface, it has a configuration in section as shown in FIGURE 4. Thus the configuration is such as to form a convex surface portion 34a, located between the concave surface portions 34b. These surface portions are curved and merged together as illustrated. As indicated, the radius $R_1$ to which the convex surface 34a conforms is substantially greater than the radius $R_2$ to which the surfaces 34b conform. Likewise it will be noted that the center of radius $R_1$ lies somewhat to the right of the plane of face 31, whereas the centers of radii $R_2$ are in a plane displaced to the left of the face 31. The convex surface portion 34a represents a portion of the insert which extends beyond or to the left of the face 31, whereby the concave surface portions 34b, which may be described as valleys, extend to the right of the face 31.

In a typical instance radii $R_1$ and $R_2$ may be .050 and .030 inch respectively. The centers of these radii may be spaced about .020 and .010 respectively to the right and to the left of the plane of face 31.

At the time the valve is assembled the gate 14 is lowered to effect its insertion between the sealing assemblies. This causes the seal rings 21 to be displaced to somewhat compress the springs 26. Within the lattitude of permissible movement of the gate in a direction corresponding to the axis of openings 12, the springs continue to urge the seal rings 21 against the gate.

When a seal ring as described above is pressed against a flat valve working surface, namely the side of the gate 14, the convex surface portion 34a is compressed by an amount depending upon the amount of pressure applied to the seal ring. With application of sufficient force between the seal ring and the gate, the projecting portion of the insert is completely compressed to the plane of the face 31, as is shown in FIGURE 5. The proportioning of the insert is such that under such fully compressed conditions some spaces 36 still remain, these spaces being present by virtue of the fact that the volume of resilient material displaced within the recess 33 by compression is insufficient to distort the concave surface portions 34b sufficiently to bring them coincident with the plane of face 31.

Generally the condition illustrated in FIGURE 5 may exist on both upstream and downstream sides of the valve when the gate is closed and when a substantial upstream pressure is applied. The thrust of the gate under such conditions may or may not be of sufficient magnitude to compress the springs 26 to such an extent as to cause the end face 37 of the seal ring to abut the annular shoulder 38 on the valve body.

As shown in FIGURE 3, it is possible to provide limiting or stop means to limit the thrust upon the seal ring 21 on the downstream side. Thus as shown in FIGURE 3, the body may be provided with a pad 39 which is annular which generally surrounds the seal ring 21. It may be formed as an integral part of the body, or it may be attached to the inner sides of the end walls 11 as by welding. With such limiting means it may be apparent that when the seal ring 21 moves to the right as viewed in FIGURE 3 for a certain distance, the gate bears upon the pad 39 with the result that no additional thrust is applied to the seal ring.

The seal ring 21 is suitably sealed with respect to the body. For example, its outer periphery can be provided with a groove 40 for accommodating the sealing means 41 which may be of the resilient O-ring type. Thus a seal is formed between the seal ring and the cylindrical surface 22 of the body.

The sealing assembly can be constructed to utilize differential fluid pressure to aid in urging the upstream seal ring against the gate. Thus as illustrated the seal between the ring 21 and the cylindrical surface 22 is substantially larger in diameter than the sealing area between the insert and the valve working surface. Thus a fluid pressure area is provided which on the upstream side of the valve tends to urge the upstream seal ring against the gate.

The valve construction described above solves the problem of utilizing metal seal rings in conjunction with resilient inserts. With my construction it has been found that the valve can be operated many times under line pressure conditions without causing the inserts to be mutilated or dislodged. This is attributed to the peculiar construction of the resilient inserts which makes possible an effective seal without permitting any part of the insert to be pinched or otherwise mutilated during operation. Likewise it has been found that under operating conditions, there is no tendency for differential pressure to be applied to the inserts in such a manner as to cause their dislodgement or to cause such distortion of the inserts as may cause mutiliation.

Because my invention makes possible the use of relatively rigid metal in the construction of the seal rings, the invention is particularly applicable to valves of the larger sizes, as for example, 36–42 inch pipe size or larger, where seal rings made of nylon tend to become relatively weak.

In some instances, particularly under certain service conditions where corrosion is apt to occur on the metal surfaces between the seal ring and the body, the outer peripheral surfaces of the seal rings 22 may be coated with suitable materials, as for example synthetic resins or elastomers which facilitate free movement of the seal rings and which inhibit corrosion. Similar coatings can be applied to surfaces 22 and 23 of the body.

I claim:

1. In a valve construction, a valve body having openings forming flow passages for connection with associated piping, a valve member within the body and movable between open and closed positions, the valve member being formed to provide metal valve working surfaces, an annular sealing assembly surrounding one of said openings, said assembly being carried by the body and comprising a metal seal ring having one side face of the same in juxtaposition with said valve working surface, means forming a seal between said one side face of the seal ring and the adjacent valve working surface, and an insert ring of pliable resilient material having a durometer hardness on the A scale of the order of 60 to 90, said seal ring having a circumferential recess in its side face in which said insert is bonded, the recess merging with said side face at two corner edges that are radially spaced, said insert when relaxed presenting a configuration in section such that the exposed surfaces of the same contiguous to said one side face of the seal ring comprise radially spaced concave annular surface portions and a convex annular surface portion intermediate the concave portions and merging with the same, the concave and convex portions extending on opposite sides of a plane coincident with said side face, with the convex portion when relaxed extending outwardly of the seal ring and beyond such plane, said concave and convex annular surface portions being so dimensioned that in section the concave surfaces terminate at points coincident with said corner edges, and also so dimensioned that when the convex surface portion is compressed by forcing said side face of the ring against said adjacent valve working surface annular spaces exist between the concave surface portions and the adjacent flat valve working surface, and spring means for urging said seal ring toward the adjacent valve working surface.

References Cited

UNITED STATES PATENTS

| | | | |
|---|---|---|---|
| 2,717,793 | 9/1955 | Nenzell | 277—180 |
| 3,061,321 | 10/1962 | Smith | 277—180 |
| 136,724 | 3/1873 | Hopkins | 251—321 |
| 2,995,057 | 8/1961 | Nenzell | 251—332 X |
| 3,109,623 | 11/1963 | Bryant | 251—328 X |
| 3,215,157 | 11/1965 | Anderson et al. | 251—328 X |

ARNOLD ROSENTHAL, *Primary Examiner.*